United States Patent
Wolfington et al.

(10) Patent No.: US 6,964,246 B2
(45) Date of Patent: Nov. 15, 2005

(54) PET STEP AND METHOD

(76) Inventors: Jeanne Rae Wolfington, 460 SW. Normandy Rd., Seattle, WA (US) 98166; Karen Kristen Hanson, 460 SW. Normandy Rd., Seattle, WA (US) 98166

( * ) Notice: Subject to any disclaimer, the term of this patent is extended or adjusted under 35 U.S.C. 154(b) by 0 days.

(21) Appl. No.: 10/684,782

(22) Filed: Oct. 14, 2003

(65) Prior Publication Data

US 2004/0079297 A1    Apr. 29, 2004

Related U.S. Application Data

(60) Provisional application No. 60/419,340, filed on Oct. 18, 2002.

(51) Int. Cl.[7] .............................................. A01K 1/015
(52) U.S. Cl. ...................................... 119/849; 119/847
(58) Field of Search .. 119/847, 849; 52/182–183; 182/34–35

(56) References Cited

U.S. PATENT DOCUMENTS

| | | | |
|---|---|---|---|
| 3,173,398 A | | 3/1965 | Raymond |
| 3,992,733 A | * | 11/1976 | Racine ........................... 5/652 |
| 4,215,857 A | * | 8/1980 | Gordon ........................ 482/15 |
| 4,359,793 A | * | 11/1982 | Hosono ........................... 5/100 |
| D270,800 S | * | 10/1983 | Fuller ........................... D6/596 |
| 4,905,330 A | * | 3/1990 | Jacobs ............................. 5/705 |
| 5,007,676 A | * | 4/1991 | Lien ....................... 297/228.13 |
| D322,872 S | | 12/1991 | Holbrook |
| 5,086,530 A | * | 2/1992 | Blake ............................. 5/484 |
| 5,213,060 A | | 5/1993 | Sloan et al. |
| 5,634,440 A | | 6/1997 | Mogck |
| 5,638,562 A | * | 6/1997 | Masoncup ..................... 5/493 |
| D383,261 S | | 9/1997 | Karsten et al. |
| 5,964,634 A | * | 10/1999 | Chang ......................... 446/85 |
| 6,061,854 A | * | 5/2000 | Crowley ........................ 5/655 |
| D429,038 S | | 8/2000 | Forester |
| 6,155,207 A | | 12/2000 | La Rocca |
| 6,286,456 B1 | | 9/2001 | Michaelis |
| 2003/0154669 A1 | * | 8/2003 | Vandaan ...................... 52/182 |

* cited by examiner

Primary Examiner—Michael J. Carone
Assistant Examiner—Kimberly S. Smith
(74) Attorney, Agent, or Firm—Polly L Oliver

(57) ABSTRACT

A pet step is a modular foam core item which can be used alone or in an arrangement with other pet steps—referred to as cubes—to form a stair and offers a comfortable way for a pet that has been debilitated by age, surgery, illness, or injury to climb, e.g., from the floor to the couch and down, eliminating the impact of jumping. Each step is formed of a washable fabric cover stretched across a high-density foam core, the core being usually of regular block shape, but alternatively in the shape of a trapezoidal block, right wedge, or other. The cover may be made from various fabrics with different textures, colors, and designs, and is secured around the foam core using a band of elastic. Thus, the cover is easily removable and washable. The pet steps are intended to be used in a stair, formed by placing the steps adjacent one another with the elasticized opening of the cover on the bottom sides of the steps and mating and engaging the optional fasteners, such as hook-and-loop fasteners, which are mounted between the adjacent step surfaces.

7 Claims, 3 Drawing Sheets

PET STEP AND METHOD

RELATED APPLICATION

This application claims priority under 35 U.S.C. 119(e) to U.S. provisional application Ser. No. 60/419,340, filed on Oct. 18, 2002.

FIELD OF THE INVENTION

This invention pertains generally to pet care accessories and more specifically to steps for dogs which can be arranged in the form of a stair.

BACKGROUND OF THE FIELD

Many people who value their pets are very concerned about the pets' comfort and well-being. So, when pets get old, develop bone and joint diseases, or are otherwise disabled, their owners want to help them get around the house and be independent. The problem becomes especially obvious in the case of small dogs that are recovering from surgery and cannot jump from the floor to the bed or sofa.

There have been attempts in the past to invent devices to aid pets in climbing to different elevations. For instance, in U.S. Pat. No. 6,155,207 to LaRocca, there is disclosed a system for assembling portable steps into a stair for small pets. However, LaRocca's device does not anticipate injured or disabled pets and is constructed of hard, rigid materials that will not "give" when a pet steps on them. Also, LaRocca's stair system uses many small parts requiring relatively intensive assembly and therefore does not have the flexibility and versatility of the present invention.

Karsten in U.S. Pat. No. D383,261 and Forester in U.S. Pat. No. D429,038 both disclose pet stairs. However, these two designs are simply the rigid, immovable two-step design such as is common in kitchen or other step stools.

SUMMARY OF THE INVENTION

The present invention solves the above-mentioned problems by providing a pet step that can be arranged with other such pet steps, referred to as "cubes" regardless of shape, into a stair for aiding a pet to safely and comfortably climb from one elevation to another, e.g., from the floor to the bed or sofa. When the pet steps are so arranged into a stair, the resulting article of furniture can be an attractive addition to a home's living space as well as an aid to the pets of the home.

One aspect of the present invention comprises a foam core with an elasticized fabric cover. The core is made from high-density foam that is rigid and resilient enough to keep its three-dimensional shape and support a pet's weight, but soft enough to deform, or "give," when the pet steps on it. In this way, the pet step provides a safe, comfortable stair surface that will accommodate the pet's unique condition.

The fabric cover of the preferred embodiment has been chosen for durability and usefulness and is typically made from a single fabric sheet. Although the particular fabric used can be of different colors and designs and can even be of several sheets fastened together (instead of one continuous sheet), it is important that the cover fit snugly around all but one side of the foam core, and that the cover fabric have a relatively high coefficient of friction. When the appropriate seams are applied to the fabric sheet to induce conformance with the shape of the particular core, the fabric is gathered, and a "bag" shape results, the opening of which is sized to fit within the edges of the bottom side of the particular foam core, when elasticized. In the preferred embodiment, the elasticized opening of the cover is sized to fit on the sixth (bottom) side of a regular six-sided block such that there are approximately 2 inches of fabric between each edge and the elastic band.

By using a high-density foam material with a relatively high coefficient of friction, and having a substantial amount of the foam surface exposed on the sixth (bottom) side of the foam core block, there is enough friction to restrain the cube from sliding laterally when placed on another cube or a carpeted floor. In this way, a cube can be used singly wherever necessary. (Also, in this way, the cover is easily removable for changing or cleaning. The fabric and elastic materials allow that the cover is machine washable.) However, the invention is intended to be used mainly when several cubes are stacked and arranged into a stair. To enhance the stability of the stair, a unique fastening system has been invented whereby each cover (depending on the particular core to which it applies) is supplied with a plurality of fasteners, e.g., hook-and-loop, such fasteners being strategically mounted, in their hook and loop counterparts, to specific locations on the covers.

In alternate embodiments, the foam core takes the shape of a right wedge or a six-sided trapezoidal block. The wedge shape, when covered with the fabric cover, functions as a ramp cube and can be combined with one or more regular block cubes to form a stair with a ramp in a ramped configuration. The trapezoidal block, when covered with the fabric cover, functions as a ramp extension cube and can be used in concert with the wedge cube and the regular block cubes to form a higher ramp in a ramped configuration.

This modular design allows that the pet steps can be arranged in a wide variety of configurations, including configurations that will fit into large or small spaces, such as motor homes, and accommodate varying differences between elevations.

DETAILED DESCRIPTION OF THE PREFERRED EMBODIMENT

Figure 1:
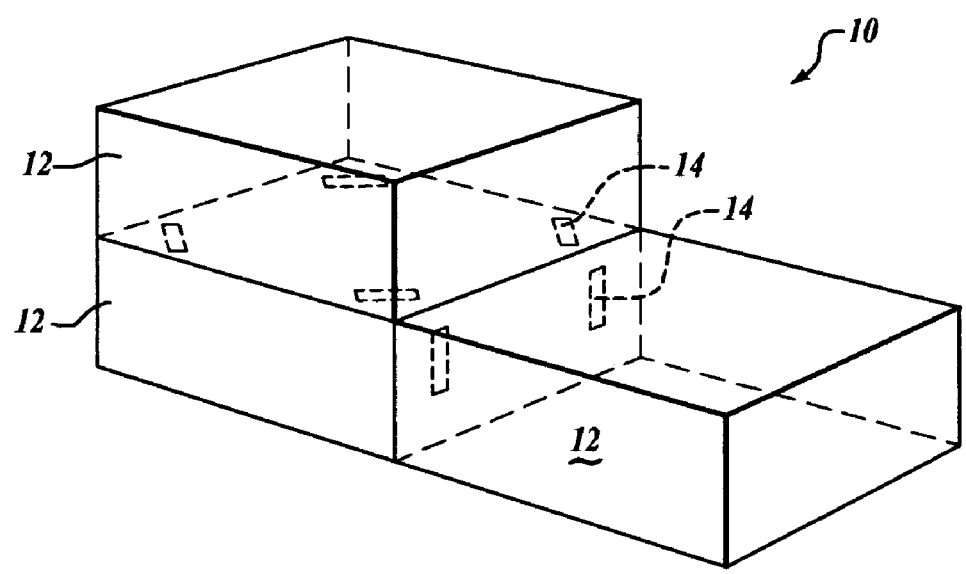
FIG. 1 is a perspective view of the pet steps of the invention as they are intended to be arranged into a 3-cube stair.
Figure 2:
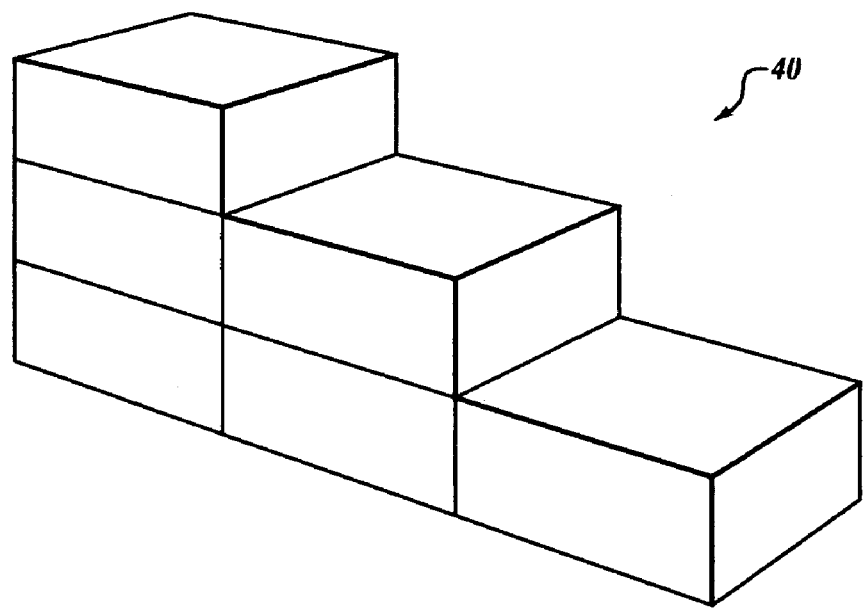
FIG. 2 is a perspective view of the pet steps of the invention as they are intended to be arranged into a 6-cube stair.
Figure 3:
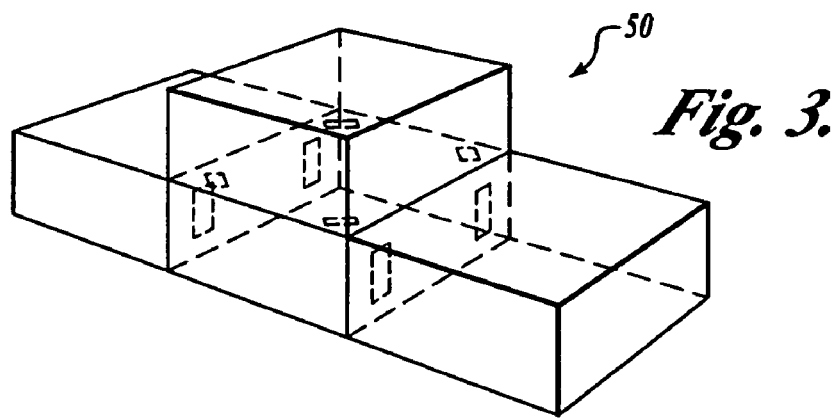
FIG. 3 is a perspective view of the pet steps of the invention as they are intended to be arranged into a 4-cube stair.

FIG. 1 shows a stair 10 comprising several of the pet steps (cubes) 12. In this preferred arrangement, the cubes 12 are arranged to form a stair 10 of three cubes made of regular six-sided blocks. This arrangement is typical and exemplary only and is not intended to be the only possible arrangement of the steps 12. For instance, a cube 12 could be used alone, or the cubes 12 could be arranged into a stair 10 with more steps or into one that is wider, such as the alternate embodiment stairs in FIG. 2 (6-cube stair 40) and FIG. 3 (4-cube stair 50).

In the embodiments shown in the figures, the cubes 12 are fastened together with hook-and-loop fasteners 14 (see FIG. 1), such as VELCRO™, which are mounted on the cubes 12 in a systematic, strategic fashion. The hook portion 14a and the loop portion 14b are mounted in corresponding locations on the covers of adjacent cubes 12 so that they will mate, engage, and fasten upon assembly of the stairs 10. (Typical separate portions 14a and 14b are shown best in the exploded view of FIG. 6, and the fasteners 14 are shown in phantom lines in FIGS. 1 and 3.)

Figure 4:
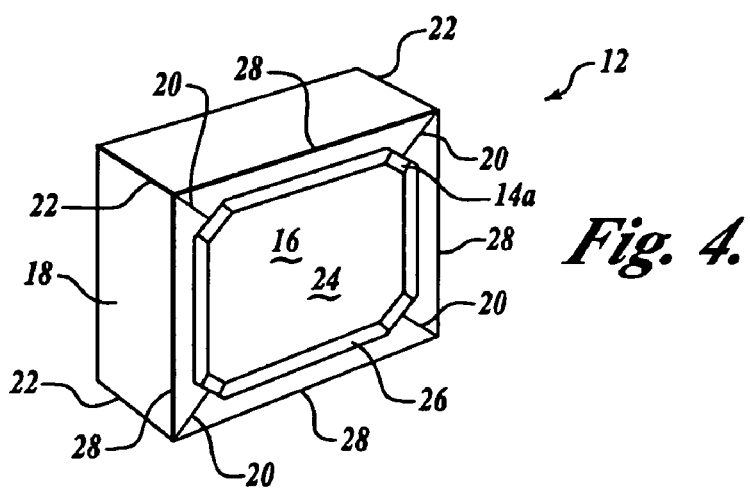
FIG. 4 is a detail view of the bottom side of a single pet cube.
Figure 6:
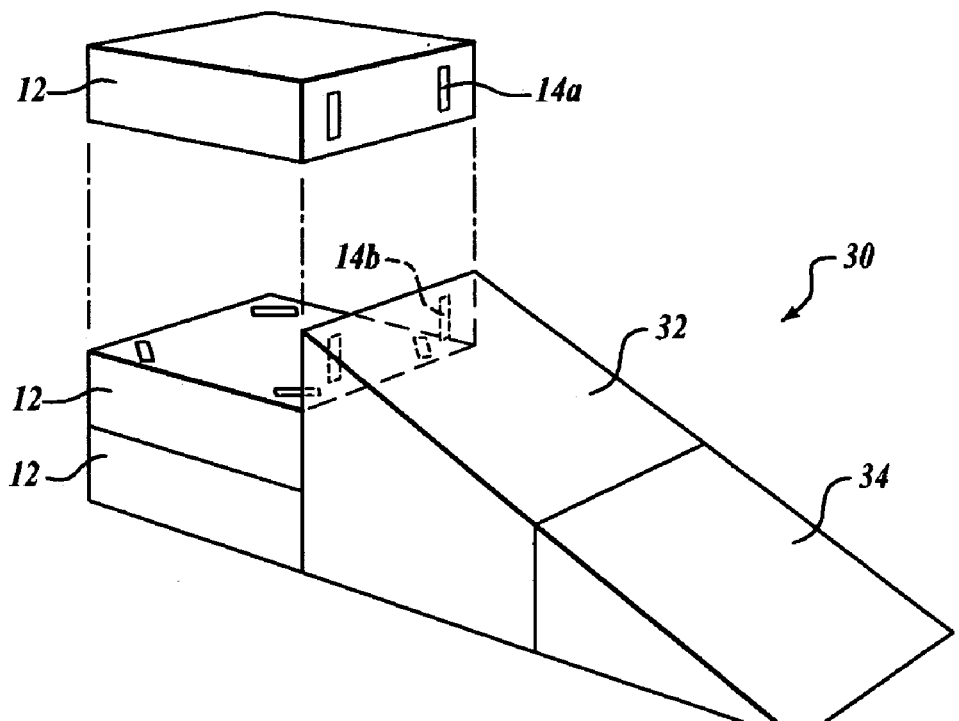
FIG. 6 is a perspective partly-exploded view of an alternate embodiment of the pet steps of the invention as they are intended to be arranged into a large ramp stair.
Figure 7:
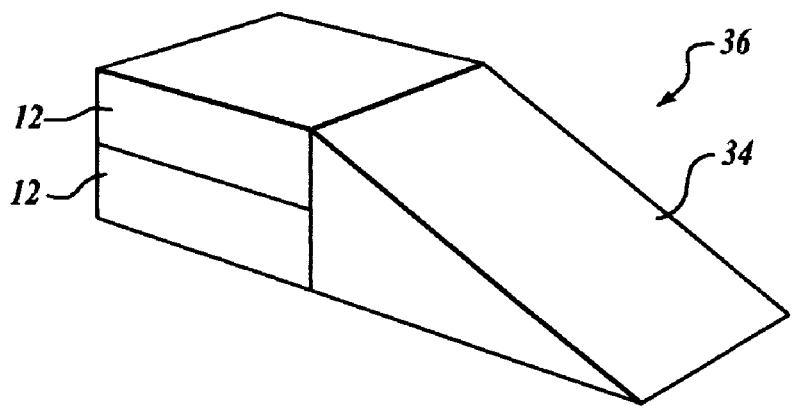
FIG. 7 is a perspective view of an alternate embodiment of the pet steps of the invention as they are intended to be arranged into a small ramp stair.

As can be seen in FIG. 4, each cube 12 comprises a foam core 16 and a cover 18. In the preferred embodiment, the foam core 16 is in the shape of a regular six-sided block—with a top, a bottom, four sides, and four corners—because the block shape lends itself well to the stair design and to the illustrations; however, any appropriate shape could be used to practice the invention. (For instance, two different shapes, a trapezoidal block and a wedge, are shown in FIGS. 6 and 7.) Referring still to FIG. 4, the cover 18 is gathered into four seams 20 at the corners 22 and elasticized at the opening 24 so that it fits snugly around the core 16. (In the preferred embodiment of the six-sided cube, the four seams 20 are spaced evenly around the opening 24 and extend roughly perpendicularly from the elastic band 26 so that they can correspond with the corners 22.) The elastic band 26 is affixed all along the opening 24 so that the band 26 fits within the four edges 28 of one side of the foam block core 16, referred to as the bottom side.

It is important that the cover 18 fit snugly around the core 16 so that the band 26 is fully within the edges 28 so as to achieve the appropriate proportion between covered area and uncovered area on the bottom side of the core 16. The appropriate proportion allows that the cover 18 will stay snug around the core 16, but that the exposed area of the bottom side of the core 16 will maintain friction between the bottom side of the core 16 and the surface on which it is placed. In many instances, such surface will be a carpeted floor or the cover of an underlying cube 12. For this reason, in the preferred embodiment, the appropriate proportion has been determined to be approximately ⅓.

Figure 5:
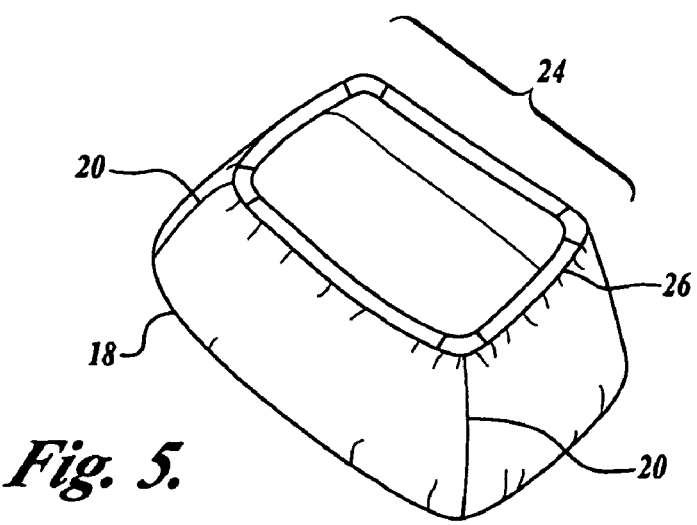
FIG. 5 is a detail view of the cover.

The "bag" shape of the cover 18, shown in FIG. 5, is created by the arrangement of the seams 20, and the bag must have an opening 24 large enough so that the cover 18 can be easily installed on and removed from the foam block core 16 for changing and cleaning. Once the user has applied the cover 18 to the core 16, the user stacks the cubes 12 as necessary to arrange the stair 10 with the elastic band 26 on the bottom side of each cube 12.

Once assembled, the cubes 12 will be held in place at least by the friction between the bottom side of the core 16 and the underlying surface. However, as an option, the cubes 12 may also be held together by additional fasteners such as the hook-and-loop fasteners 14, to be applied in appropriate places between the cubes 12. If the hook portion 14a or loop portion 14b is to be located on a top or bottom, it is generally located proximate a corner. If the portion 14a or 14b is to be located on a side, it is generally located proximate an edge. (See FIG. 6.) In FIGS. 4 and 5, the hook portions 14a are attached to the elastic band 26 so as to co-locate with the corners of the cube 12. This modular design and the ease of assembly give the stairs versatility and allow that the stairs may be built up, broken down, and reapplied quickly and easily.

The alternate embodiments of FIGS. 6 and 7 show how a short ramp cube 32 and a long ramp cube 34 may be used in the design of the stairs 30 and 36 respectively. Although the cores will have different shapes than a regular six-sided block, each shape still defines a "bottom," and the invention remains the same. The covers for these cores still open in a "bag"-like shape and fit onto the cores with the elasticized opening within the edges of the bottom side.

What is claimed is:

1. An article of furniture for pets comprising:
 a first pet step comprising a high-density foam core of three-dimensional shape, said high-density foam having a relatively high coefficient of friction, and defining a bottom, a cover removably mounted to said core, said cover being constructed from a fabric having a relatively high coefficient of friction and having a plurality of seams arranged therein so as to define a bag shape with an opening therein, an elastic band mounted to the cover at said opening, said cover being fitted around said core such that the band locates entirely within the perimeter of the bottom of the core leaving a substantial area of the bottom of the core uncovered and exposed, and a plurality of fasteners systematically and strategically mounted to specific locations on the cover,
 a second pet step comprising a high-density foam core of three-dimensional shape, said high-density foam having a relatively high coefficient of friction, and defining a bottom, a cover removably mounted to said core, said cover being constructed from a fabric having a relatively high coefficient of friction and having a plurality of seams arranged therein so as to define a bag shape with an opening therein, an elastic band mounted to the cover at said opening, said cover being fitted around said core such that the band locates entirely within the perimeter of the bottom of the core leaving a substantial area of the bottom of the core uncovered and exposed, and a plurality of fasteners systematically and strategically mounted to specific locations on the cover, and
 said second pet step being removably mounted to the first pet step such that the bottom of the second step, including the exposed area of the core, mates with and is adjacent the cover of the first step and the fasteners therebetween are engaged.

2. The article of furniture of claim 1 wherein the fasteners comprise hook-and-loop fasteners and are systematically and strategically mounted in specific, corresponding locations to the mating surfaces of the adjoining blocks.

3. The article of furniture of claim 2 wherein each hook-and-loop fastener comprises a hook portion and a loop portion and the hook portion is mounted to the cover of the first block and the loop portion is mounted to the cover of the second block such that the portions will mate upon assembly.

4. The article of furniture of claim 3 further comprising a third pet step, said third pet step comprising a high-density foam core of three-dimensional shape, said high-density foam having a relatively high coefficient of friction, and defining a bottom, a cover removably mounted to said core, said cover being constructed from a fabric having a relatively high coefficient of friction and having a plurality of seams arranged therein so as to define a bag shape with an opening therein, an elastic band mounted to the cover at said opening, said cover being fitted around said core such that the band locates entirely within the perimeter of the bottom of the core leaving a substantial area of the bottom of the core uncovered and exposed, and a plurality of hook-and-loop fasteners systematically and strategically mounted to specific locations on the cover, and the steps being removably mounted adjacent each other and arranged into a stair such that the hook-and-loop fasteners, having a hook portion and a loop portion, are mated and engaged.

5. A method for constructing a pet stair from a plurality of pet steps, each such step comprising a high-density foam core of three-dimensional shape, said high-density foam having a relatively high coefficient of friction, and each core defining a bottom, a cover removably mounted to said core, said cover being constructed from a fabric having a relatively high coefficient of friction and having a plurality of seams arranged therein so as to define a bag shape with an opening therein, and an elastic band mounted to the cover at said opening, said cover being fitted around said core such that the band locates entirely within the perimeter of the bottom of the core leaving a substantial area of the bottom of the core uncovered and exposed wherein the steps further comprise hook-and-loop fasteners systematically and strategically mounted to specific locations on the cover, each fastener having a hook portion and a loop portion, comprising the steps of:

assembling the individual pet steps to be used by fitting the covers on the cores so that the seams generally locate on the corners of the cores and the bands locate entirely within the perimeters of the bottoms of the cores leaving a substantial area of the bottom of the core uncovered and exposed, arranging the pet steps adjacent each other in a stair configuration as desirable so that the bottom of at least one step including the exposed portion of the core, is adjacent the cover of at least one step, and fastening the pet steps to each other by securing the hook portion of a hook-and-loop fastener to the corresponding loop portion of a mating hook-and-loop fastener, thereby engaging the fasteners.

6. The method of claim 5 wherein the foam cores are of regular six-sided block shape and the steps are arranged in a three-step stair.

7. The method of claim 5 wherein the foam cores are of regular six-sided block shape and the steps are arranged in a four-step stair.

* * * * *